May 5, 1970   E. I. GORDON   3,510,200
MATCHING TRANSFORMER FOR OPTICAL TRANSMISSION DEVICES
Filed Feb. 28, 1966
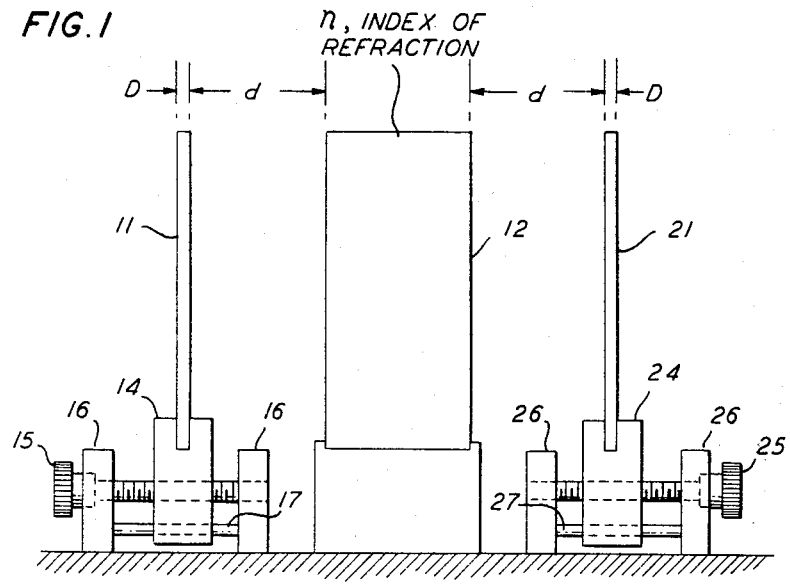
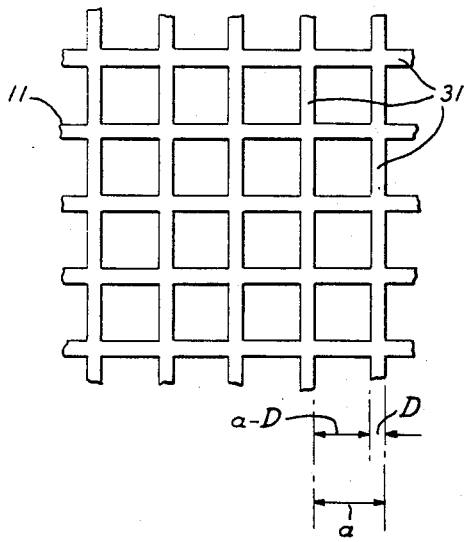
INVENTOR
E. I. GORDON
BY Wilford L. Wisner
ATTORNEY

United States Patent Office 3,510,200
Patented May 5, 1970

3,510,200
MATCHING TRANSFORMER FOR OPTICAL
TRANSMISSION DEVICES
Eugene I. Gordon, Convent Station, N.J., assignor to
Bell Telephone Laboratories, Incorporated, New York,
N.Y., a corporation of New York
Filed Feb. 28, 1966, Ser. No. 530,539
Int. Cl. G01b 27/00
U.S. Cl. 350—163          6 Claims

ABSTRACT OF THE DISCLOSURE

A matching transformer for infrared radiation is disclosed. The matching transformer employs a partially transmissive, highly conductive reflector that has an appropriate laterally-varying reflectivity pattern, such as a square mesh, and an appropriate spacing from the optical device to be matched.

---

This invention relates to matching transformers for use in systems in which radiant energy propagates through a plurality of different media.

A variety of recent proposals have been directed to communication in the visible and infrared portions of the electromagnetic spectrum. These proposals have been concentrated upon such components as oscillators, amplifiers, modulators, frequency shifters, detectors, focusing and beam steering devices.

Nevertheless, a number of other devices are needed for the successful implementation of such a communication system. Among these devices are matching transformers. Specifically, a matching transformer would typically be used to reduce undesired reflections whereever the propagating electromagnetic energy passes from one medium to another, if the media have differing indices of refraction for the energy and have an optically smooth interface. The matching transformer should eliminate the reflections; in other words, it should provide an impedance match between the different media, so that the radiant energy is efficiently transferred from the one medium to the other.

In the microwave portion of the electromagnetic spectrum, guided propagation is generally used; and a matching transformer usually comprises a waveguide essentially a quarter-wave long, providing particular dimensional discontinuities in the guides being matched or having particular reactive devices disposed therein. Multiple sections of waveguide may also be used.

In the visible portion of the electromagnetic spectrum, unguided propagation is generally used; and in the past a matching transformer has usually comprised a layer of transmissive dielectric material one-quarter wavelength thick having an index of refraction that is the geometric mean of the respective indices of refraction of the different media being matched. Multiple dielectric layers have also been used.

Nevertheless, in the far infrared portion of the electromagnetic spectrum, in which unguided propagation seems generally more practical than guided operation, there have been almost no transmissive dielectric materials having indices of refraction that are the geometric means of the indices of the components that would normally be used in an infrared communication system. In addition, quarter-wave layers of dielectric material are not easily fabricated. This situation exists in other wavelength bands throughout the electromagnetic spectrum.

Therefore, an object of my invention is a matching transformer particularly well suited for use at far infrared wavelengths and other wavelengths for which suitable quarterwave transformers are unavailable.

My invention resides in the recognition that a matching transformer for matching a transmission device to a transmission medium can be realized from a partially transmissive highly conductive, i.e., metallic, reflector that has the appropriate laterally varying reflectivity pattern and spacing from the device to produce cancelling reflections in response to electromagnetic wave energy transmitted through both the highly conductive reflector and the device in tandem. Thus, the reflection from the interface of transmission medium and transmission device and the reflection from the highly conductive reflector must be equal in magnitude and opposite in phase.

A more complete understanding of my invention may be obtained from the following detailed description, taken together with the drawing, in which:

FIG. 1 is a side pictorial view of an arrangement illustrative of a preferred embodiment of the invention; and FIG. 2 is a front pictorial view of a portion of a mesh-type metallic reflector of the type used in the arrangement of FIG. 1.

In FIG. 1, the device 12 of optical bulk material is a typical component of an optical communication system. For example, the device 12 may be an optical modulator. The elements 11 and 21 on opposite sides thereof are mesh-type metallic reflectors of the type shown in FIG. 2, adapted and disclosed with respect to the device 12 in the manner to be described as required by the present invention.

Since the transmission path within the device 12 typically has an index of refraction substantially different from that of the preceding transmission medium, i.e., free space (vacuum) or the atmosphere, entering electromagnetic energy is partially reflected because of the dielectric discontinuity.

This reflection is called the Fresnel reflection and is described by the equation $$R_\mathrm{F} = \left[\frac{n-1}{n+1}\right]^2 \tag{1}$$

where $R_\mathrm{F}$ is the Fresnel reflectivity, or fraction of the incident electromagnetic energy reflected because of the discontinuity, $n$ is the index of refraction of the transmission medium within the device 12 and the integer 1 is the index of refraction of the preceding transmission medium, assumed to be free space. In general, this assumption is a practical one, since matching all components to free space yields greater system adaptability and broader bandwidth.

Metallic reflector 11 is mounted in suitable adjustable mounting apparatus including the carriage 14, the thumbscrew 15 which passes through carriage 14 and has threads mated in internal threads therein, the stationary mounts 16 which have internal threads mated to those of screw 15, and the guide rod 17 which passes through carriage 14 in sliding contact with a guide passage in the carriage.

Metallic reflector 21 is similarly mounted in an adjustable mounting apparatus.

The reflectivity of the metallic reflector 11 and its spacing from the device 12 are determined as follows. Only the reflector 11 and the device 12 are considered at this point, for reasons that will become clear later.

Let $R_\mathrm{g}$ be the reflectivity of reflector 11 at the wavelength of interest. It can be shown that the reflector 11 can be characterized in tandem sequence by a length of free space having a phase shift $\Phi_{g1}$, which is of no consequence to the discussion at hand and will be ignored henceforth, an infinitely thin reflector of reflectivity $R_\mathrm{g}$, which in analogy to parallel wire transmission media is equivalent to an ideal transformer of turns ratio $$N_g = \left[\frac{1+R_g^{1/2}}{1-R_g^{1/2}}\right]^{1/2} \quad (2a)$$

or inversely, $$R_g = \left[\frac{N_g^2-1}{N_g^2+1}\right]^2 \quad (2b)$$

and another length of free space having a phase shift $\Phi_{g2}$, less than $\pi/2$. Alternatively, reflector 11 can be be represented by an ideal transformer of turns ratio $N_g^{-1}$ if the following phase shift is represented as $\Phi'_{g2}$, while $$\Phi'_{g2} = \Phi_{g2} + \frac{\pi}{2}$$

To match the medium of index $n$ the grid is placed a distance $d$ in front of the medium such that the net reflectivity of the grid and surface is zero. In general, the net reflectivity is given by the following equation for either equivalent representation of reflector 11:

$$R = \left|\frac{(N_g^2-n)\cos(\Phi_{g2}+\Phi_3)+(N_g^2n-1)i\sin(\Phi_{g2}+\Phi_3)}{(N_g^2+n)\cos(\Phi_{g2}+\Phi_3)+(N_g^2n+1)i\sin(\Phi_{g2}+\Phi_3)}\right|^2 \quad (3)$$

where $$\Phi_3 = \frac{2\pi d}{\lambda_0} \quad (4)$$

$i=\sqrt{-1}$, and $N_g$ may be replaced by $N_g^{-1}$ and $\Phi_{g2}$ by $\Phi'_{g2}$ for the other equivalent representation of reflector 11. It can be seen that $$R = 0 \text{ when } \Phi_3 = m\pi - \Phi_{g2} \quad (5)$$

where $m$ is an integer and $$N_g = n^{1/2} \quad (6)$$

As an alternative solution, $R=0$ when $$\Phi_3 = \frac{2\pi d}{\lambda_0} = m\pi - \left(\Phi_{g2} - \frac{\pi}{2}\right) \quad (7)$$

and $$N_g = \frac{1}{n^{1/2}} \quad (8)$$

Consideration of the two possible equivalent representations of reflector 11 shows that Equations 7 and 8 are more properly written:

$$\Phi_3 = \frac{2\pi d}{\lambda_0} = m\pi - \left(\Phi_{g2} - \frac{\pi}{2}\right) \quad (9)$$

and $$N_g^{-1} = \frac{1}{n^{1/2}} \quad (10)$$

so that the two solutions (Equations 5 and 6, on the one hand, and Equations 9 and 10, on the other hand), are completely equivalent and represent the same reflector 11 with the same spacing $d$ from the device 12 for a given value of $m$.

Expressing either solution in terms of $R_g$, we find using Equation 2 that for the desired matching $$R_g = \left[\frac{n-1}{n+1}\right]^2 \quad (11)$$

and in either case, $$d = \frac{\lambda_0}{2\pi}[m\pi - \Phi_{g2}] \quad (12)$$

where $\Phi_{g2}$ is always taken as an angle less than $\pi/2$.

It should be further noted that, for matching according to the embodiment of FIG. 1, the reflectivity of $R_g$ of the reflector 11 is equal to the Fresnel reflectivity of the device 12. The desired reflectivity for the reflector 11 can be achieved for the wavelength of interest by known techniques, typically by appropriate design of the reflector as is described below. The equivalent phase shift $\phi_{g2}$ of reflector 11 is related to its thickness in the direction of propagation of the beam and is best determined experimentally. Nevertheless, in order to position the reflector 11 initially very near to the matching position, $\Phi_{g2}$ may be assumed to be zero. The assembly including reflector 11 is then positioned as indicated by Equation 12 above, and the thumbscrew 15 is then employed to move reflector 11 toward the device 12 until no reflection of an electromagnetic wave of the desired frequency is measured along the path of incidence.

With the value of $R_g$ given by Equation 11 and the appropriate spacing $d$ of reflector 11 from the device 12, as approximately given by Equation 12, the reflection from the combination of reflector 11 and device 12 will be identically zero and the incident electromagnetic energy will be matched into device 12.

Moreover, if the electromagnetic energy is propagated in the first instance to the left from inside device 12 toward reflector 11, the net reflection back into the device 12 is zero; and the energy is matched into the atmosphere.

By an extension of this reasoning, matching reflector 21 is made identical to matching reflector 11 and is placed symmetrically with respect to device 12. That is, the surfaces of devices 11 and 21 that face toward device 12 are alike; and their surfaces that face away from device 12 are alike. They have the same spacing $d$ from the device 12.

From FIG. 2 it can be seen that the reflectors 11 and 12 are mesh-type reflectors having square symmetry, i.e., identical properties along any two orthogonal directions in the plane of the mesh, in order to be polarization-insensitive. Illustratively, each reflector 11 or 21 comprises a grid of two orthogonally crossed sets of linear elements 31. Elements within each set are parallel; and the two sets have like element width D and like element center-to-center spacing $a$. Each reflector could also comprise any regular array of reflective elements, i.e., reflective dots or holes in a reflective sheet, having square symmetry. The desired $R_g$ can be achieved by appropriate design of any such array, as described by J. Munushian, "Electromagnetic Propagation Characteristics of Space Arrays of Apertures in Metal-in-Metal Discontinuities and Complementary Structures," University of California (Berkeley) Division of Electrical Engineering, Electronics Research Laboratories, Institute of Engineering Research Series No. 60, Issue No. 126, Sept. 26, 1954.

While the invention has been disclosed in its preferred form, which provides matching of a transmission device to the atmosphere or free space, it should be understood that one skilled in the art can readily modify the foregoing results to provide matching to an arbitrary transmission medium.

Moreover, if one wishes to sacrifice system adaptability, bandwidth and interchangeability of parts to achieve a measure of compactness, each device may be individually matched to the particular devices preceding and following it with only one metallic mesh-type reflector between it and each cascaded device. This arrangement also requires critical spacing of components.

Still further, to provide structural rigidity among the components of a transmitter or a receiver in a communication system, it may be desirable to fill the spaces between the device 12 and the reflectors 11 and 21 with a transparent dielectric material. In general, the result will be to reduce the required reflectivity $R_g$ of the reflector and to reduce the spacing $d$.

In all cases, the use of a metallic reflector avoids the conventional requirement of a dielectric material having an index of refraction that is the geometric mean between that of the transmission medium and the device into which the wave energy is matched or the requirement of a multiplicity of dielectric layers.

Various other modifications of the invention are within its spirit and scope.

What is claimed is:

1. In combination, an infrared optical transmission device of bulk optical material having an index of refraction differing from that of the intended transmission medium, and a partially reflective highly conductive device cascaded with the transmission device and having laterally-varying and polarization-insensitive reflectivity pattern, the spacing of said conductive device from said optical transmission device and the reflectivity of said conductive device being mutually adapted to produce cancelling reflections in response to infrared electromagnetic wave energy transmitted through both of said devices.

2. A combination according to claim 1 in which the highly conductive device comprises a regular array of highly conductive elements, said array having square symmetry.

3. A combination according to claim 2 in which the array of elements comprises two intersecting sets of elongated metallic elements, the elements of each set being parallel to one another.

4. A combination according to claim 3 in which the elements of both sets have the same width and the same spacing from parallel elements.

5. A combination according to claim 1 in which the highly conductive device has a reflectivity $$R_g = \left[\frac{n-1}{n+1}\right]^2$$

where $n$ is the index of refraction of the optical transmission device, and has a spacing $d$ from the optical transmission device $$d = \frac{\lambda_0}{2\pi}[m\pi - \Phi_{g2}]$$

where $m$ is an integer, $\lambda_0$ is the wavelength of the electromagnetic wave energy to be transmitted through said transmission device, and $\Phi_{g2}$ is a phase shift angle less than $\pi/2$ associated with the thickness of said highly conductive device.

6. A combination according to claim 1 including a second highly conductive device substantially similar to the first-said highly conductive device, said second conductive device being cascaded with the optical transmission device and separated from the first-said conductive device by the optical transmission device, said first and second conductive devices being symmetrically oriented with respect to said transmission device.

References Cited

UNITED STATES PATENTS 2,530,818  11/1950  Fox.
3,148,370  9/1964  Bowman.

OTHER REFERENCES

Hadley and Dennison, "Reflection and Transmission Interference Filters," Journal of the Optical Society of America, vol. 37, No. 6, June 1947, pp. 451–465.

Lewis and Casey, "Metal Grid Interference Filter," 41 J.O.S.A. 360, May 1951.

DAVID SCHONBERG, Primary Examiner

T. H. KUSMER, Assistant Examiner

U.S. Cl. X.R.

331—94.5; 350—1